(12) United States Patent
Ye et al.

(10) Patent No.: US 12,454,168 B2
(45) Date of Patent: Oct. 28, 2025

(54) PICKUP TRUCK ADD-ON ASSEMBLY AND PICKUP TRUCK

(71) Applicant: Anhui Wollin International Co., Ltd., Anhui (CN)

(72) Inventors: Jinsong Ye, Anhui (CN); Kai Hu, Anhui (CN)

(73) Assignee: Anhui Wollin International Co., Ltd., Anhui (CN)

( * ) Notice: Subject to any disclaimer, the term of this patent is extended or adjusted under 35 U.S.C. 154(b) by 0 days.

(21) Appl. No.: 18/001,969

(22) PCT Filed: May 26, 2022

(86) PCT No.: PCT/CN2022/095212
§ 371 (c)(1),
(2) Date: Dec. 15, 2022

(87) PCT Pub. No.: WO2023/184686
PCT Pub. Date: Oct. 5, 2023

(65) Prior Publication Data
US 2024/0140181 A1    May 2, 2024

(30) Foreign Application Priority Data
Apr. 2, 2022    (CN) .......................... 202210343602.1

(51) Int. Cl.
*B60J 7/16*     (2006.01)
*B60J 10/80*    (2016.01)
(Continued)

(52) U.S. Cl.
CPC ........... *B60J 7/1621* (2013.01); *B60J 7/1614* (2013.01); *B60R 9/045* (2013.01); *B60J 10/80* (2016.02);
(Continued)

(58) Field of Classification Search
CPC ...... B60J 7/1614; B60J 7/1621; B60J 7/1607; B60J 7/16; B60J 7/198; B60J 7/201;
(Continued)

(56) References Cited

U.S. PATENT DOCUMENTS 5,322,336 A * 6/1994 Isler .................... B60J 7/1621
296/100.1
5,364,154 A * 11/1994 Kaiser .................. B60P 3/341
296/105
(Continued)

FOREIGN PATENT DOCUMENTS

CN    209277418 U    * 8/2019
CN    110497782 A    * 11/2019    .............. B60J 7/141
CN    210822487 U    * 6/2020

*Primary Examiner* — Joseph D. Pape
*Assistant Examiner* — Denise Lynne Esqui
(74) *Attorney, Agent, or Firm* — Budzyn IP Law, LLC

(57) ABSTRACT

A pickup truck add-on assembly is provided, which includes: a base configured to be and fixedly mounted to a pickup truck bed, an upper cover, and at least one driving assembly, wherein the driving assembly comprises a driving mechanism and a support arm, the support arm being respectively hinged to the upper cover and the base, the driving mechanism being hinged to the support arm and configured to drive the support arm to rotate, so that a hinge joint between the support arm and the upper cover in an initial hinge position: i. moves from the hinge position relative to the base in a height direction; and ii. moves laterally, in a direction transverse to the height direction, (Continued)

from the hinge position. In addition, a pickup truck is provided having a pickup truck add-on assembly mounted thereon as described above.

19 Claims, 10 Drawing Sheets

(51) Int. Cl.
  *B60R 9/045* (2006.01)
  *B60R 3/02* (2006.01)
  *B60R 13/04* (2006.01)

(52) U.S. Cl.
  CPC ............... *B60R 3/02* (2013.01); *B60R 13/04* (2013.01); *E05Y 2201/41* (2013.01); *E05Y 2201/422* (2013.01); *E05Y 2201/604* (2013.01); *E05Y 2900/53* (2013.01)

(58) Field of Classification Search
  CPC ... B60J 10/00; B60J 10/82; B60J 10/86; B60J 10/87; B60J 10/90; B60J 10/32; B60J 10/33; B60R 9/045
  USPC ............ 296/100.02, 100.04, 100.05, 100.06, 296/100.07, 100.08, 100.09, 100.1, 37.6
  See application file for complete search history.

(56) References Cited

U.S. PATENT DOCUMENTS

| | | | | |
|---|---|---|---|---|
| 5,636,893 A * | 6/1997 | Wheatley | ................. | B60J 7/141 296/100.09 |
| 5,788,315 A * | 8/1998 | Tucker | ..................... | B60J 7/102 160/395 |
| 5,868,453 A * | 2/1999 | Steigner | .................... | B60P 3/40 296/100.1 |
| 6,042,173 A * | 3/2000 | Nett | ....................... | B60R 13/01 296/100.06 |
| 6,217,102 B1 * | 4/2001 | Lathers | ................. | B60J 7/1614 296/100.1 |
| 6,340,194 B1 * | 1/2002 | Muirhead | ............. | B60J 7/1621 296/100.1 |
| 6,588,826 B1 * | 7/2003 | Muirhead | ............. | B60J 7/1621 296/100.06 |
| 6,666,490 B1 * | 12/2003 | Thacker | ................ | B60J 7/1614 296/100.1 |
| 7,959,200 B2 * | 6/2011 | Voglmayr | ................ | B60P 3/40 296/26.05 |
| 11,673,458 B2 * | 6/2023 | Cruckshank | ........... | B60P 7/135 296/3 |
| 2004/0195857 A1 * | 10/2004 | Chverchko | ........... | B60J 7/1621 296/100.07 |
| 2006/0279099 A1 * | 12/2006 | Ranka | .................... | B60R 11/06 296/37.6 |
| 2008/0093877 A1 * | 4/2008 | Liao | ....................... | B60J 7/1621 296/100.06 |

* cited by examiner

PICKUP TRUCK ADD-ON ASSEMBLY AND PICKUP TRUCK

CROSS-REFERENCE TO RELATED APPLICATIONS

This Application is a National Stage Application under 35 U.S.C. § 371 of PCT Application No. PCT/CN2022/095212, filed May 26, 2022, which claims priority to Chinese Patent Application No. 202210343602.1, filed Apr. 2, 2022, the entire contents of which are incorporated by reference herein.

FIELD OF TECHNOLOGY

The present disclosure relates generally to vehicles and related add-on components thereof, and in particular, to a pickup truck add-on assembly and a pickup truck.

BACKGROUND

A pickup truck is a light-weight truck provided with a roof-less cargo box at the rear of a cab, and a side plate of the cargo box is integrally connected to the cab. It is a passenger and cargo dual-purpose automobile with a cargo box at the back. Its functional advantage is that, first, it has the dual characteristics of a household vehicle and a commercial vehicle (passenger and cargo dual-purpose) and has significant features of a vehicle used both for business purpose and private purpose, and secondly, it has diversified structures so as to satisfy wider requirements (double doors or four doors, long cargo box or short cargo box, two-wheel drive or four-wheel drive, gasoline or diesel engine).

With the increasing westernization of Chinese human lifestyle, the pickup trucks have been favored by many citizens. Moreover, as the enthusiasts for retrofitting scale up, the refitting of pickup truck becomes one of the most highly sought-after categories in retrofitting. A common retrofitting approach is to add a rear cover on the bed of a pickup truck. However, a conventional rear cover for a pickup truck is hinged on one side to an edge of the bed, and then the bed is uncovered by lifting the rear cover upward. In such an opening manner, the lifted rear cover is always located right above the bed, making the rear cover prone to be bumped when taking/placing luggage, especially large pieces of luggage.

BRIEF SUMMARY

An object of the present disclosure is to propose a pickup truck add-on assembly and a pickup truck so as to solve the technical problem discussed in the background section.

Provided in the present disclosure is a pickup truck add-on assembly, comprising: a base configured to be matched with and fixedly mounted to the pickup truck bed, an upper cover, and at least one driving assembly, wherein the driving assembly comprises a driving mechanism and a support arm, two ends of the support arm are respectively hinged to the upper cover and the base, the driving mechanism is hinged to the support arm and is configured to drive the support arm to rotate, so that a hinge joint between the support arm and the upper cover moves close to/away from the base in a height direction. When the driving mechanism drives the support arm to rotate, the hinge joint between the support arm and the upper cover moves from a left side to a right side of the hinge position between the support arm and the base, or moves from the right side to the left side of the hinge position between the support arm and the base.

Preferably, the driving mechanism is configured to drive the support arm to rotate to a horizontal state, and when the support arm is in the horizontal state, the upper cover abuts against the base.

Preferably, when the support arm is in the horizontal state, an upper accommodating groove provided on the upper cover is snap-fitted with a lower accommodating groove provided on the base to accommodate the support arm therebetween.

Preferably, the upper cover comprises a middle decorative plate and an outer frame body formed by at least four profiles C and four corner connectors C connected end to end; one end of the support arm is hinged to the outer frame body; and each edge portion of the middle decorative plate is adapted to be accommodated in a circumferential groove provided on the inner side of the outer frame body.

Preferably, each of the corner connectors C has two vertically disposed plug-in portions C, and the two plug-in portions C are respectively inserted into end portions of two adjacent ones of the profiles C and fixed thereto.

Preferably, the middle decorative plate is a honeycomb panel or a PVC panel.

Preferably, the base comprises at least two oppositely disposed profiles A, and the support arm is mounted between each of the two profiles A and the upper cover for hinging the profile A and the upper cover.

Preferably, the assembly further comprises an L-shaped support which is provided on the profile A, wherein a first surface of the support is attached and fixed to an upper surface of the profile A, an adjacent surface of the support is attached and fixed to a side wall of the profile A, and the drive mechanism is located at one side of the support and hinged to the support.

Preferably, a vertical surface of the support forms a rim portion away from the profile A.

Preferably, the upper surface of the profile A is provided with a first water blocking surface above the upper surface and adapted to the length of the profile A, the upper cover is provided with a second water blocking surface, and when the upper cover abuts against the base, the first water blocking surface attaches to the second water blocking surface.

Preferably, the upper cover is provided, at an outer side of the second water blocking surface, with a clamping groove adapted to the length of the upper cover, and a waterproof rubber strip is mounted in the clamping groove. When the upper cover abuts against the base, the waterproof rubber strip abuts against the upper surface of the profiled A.

Preferably, the base further comprises a profile B, two corner connectors A and two corner connectors B, two ends of the profile B are fixedly connected to the two profiles A respectively via the two corner connectors A, and the two corner connectors B are respectively fixedly mounted on free ends of the two profiles A.

Preferably, each of the corner connectors A has two vertically disposed plug-in portions A which are respectively inserted into an end portion of one of the profiles A and an end portion of the profile B and fixed thereto, and each of the corner connectors B has a plug-in portion B which is inserted into the free end of one of the profiles A and fixed thereto.

Preferably, the profile A is provided with a sliding groove A along the length direction of the profile A, the sliding groove A is provided therein with a sliding block A slidable in the sliding groove A, the profile A is further provided with an inlet/outlet A for assembling or disassembling the sliding block A, and the sliding block A is provided thereon with a mounting hole A.

Preferably, the profile B is provided with a sliding groove B along the length direction of the profile B, the sliding groove B is provided therein with a sliding block B slidable in the sliding groove B, the profile B is further provided with an inlet/outlet B for assembling or disassembling the sliding block B, and the sliding block B is provided thereon with a mounting hole B.

Preferably, the base further comprises a headache rack, wherein a hole is provided on the headache rack, the headache rack being located on one side of the profile B away from the profile A, and being fixed to the sliding block A and/or the sliding block B by a threaded fastener passing through the hole.

Preferably, the profile C is provided with a sliding groove C along the length direction of the profile C, the sliding groove C is provided therein with a sliding block C slidable in the sliding groove C, the profile C is further provided with an inlet/outlet C for assembling or disassembling the sliding block C, and the sliding block C is provided thereon with a mounting hole C.

Preferably, the assembly further comprises a luggage rack which is mounted on the upper cover and located above the upper cover.

Preferably, the luggage rack comprises a frame body mounted on the upper cover, two side grooves arranged in parallel along the length direction of the frame body are provided on the inner side of the frame body, two ends of each of several movable plates are respectively accommodated in the two side grooves, the several movable plates are arranged in parallel, the movable plates are movable along the length direction of the frame body, and a limiting member for limiting displacement of the movable plates is mounted on the frame body between adjacent ones of the movable plates.

Preferably, the assembly further comprises a folding ladder movably assembled with the luggage rack.

The present disclosure proposes a pickup truck having a pickup truck add-on assembly mounted thereon as described above.

In the present disclosure, an upper cover and at least one driving assembly are provided, wherein the driving assembly comprises a driving mechanism and a support arm, two ends of the support arm are respectively hinged to the upper cover and the base, the driving mechanism is hinged to the support arm and is configured to drive the support arm to rotate, so that a hinge joint between the support arm and the upper cover moves close to/away from the base in a height direction, thereby driving the upper cover to switch between an open state and a closed state. This structural design is reasonable and the assembly does not occupy the space inside the pickup truck bed, so as to maximize the utilization of the bed space. Meanwhile, the driving mechanism is enabled to move horizontally while pushing the upper cover to move upwards, so that a certain open space is formed above the bed after the upper cover is completely opened, which in turn facilitates the taking and placing of goods.

BRIEF DESCRIPTION OF THE DRAWINGS

In order to more clearly illustrate the embodiments of the present disclosure or related art, the following figures which will be described in the embodiments are briefly introduced. These drawings should not be construed to limit the present disclosure.

DETAILED DESCRIPTION

Figure 1:
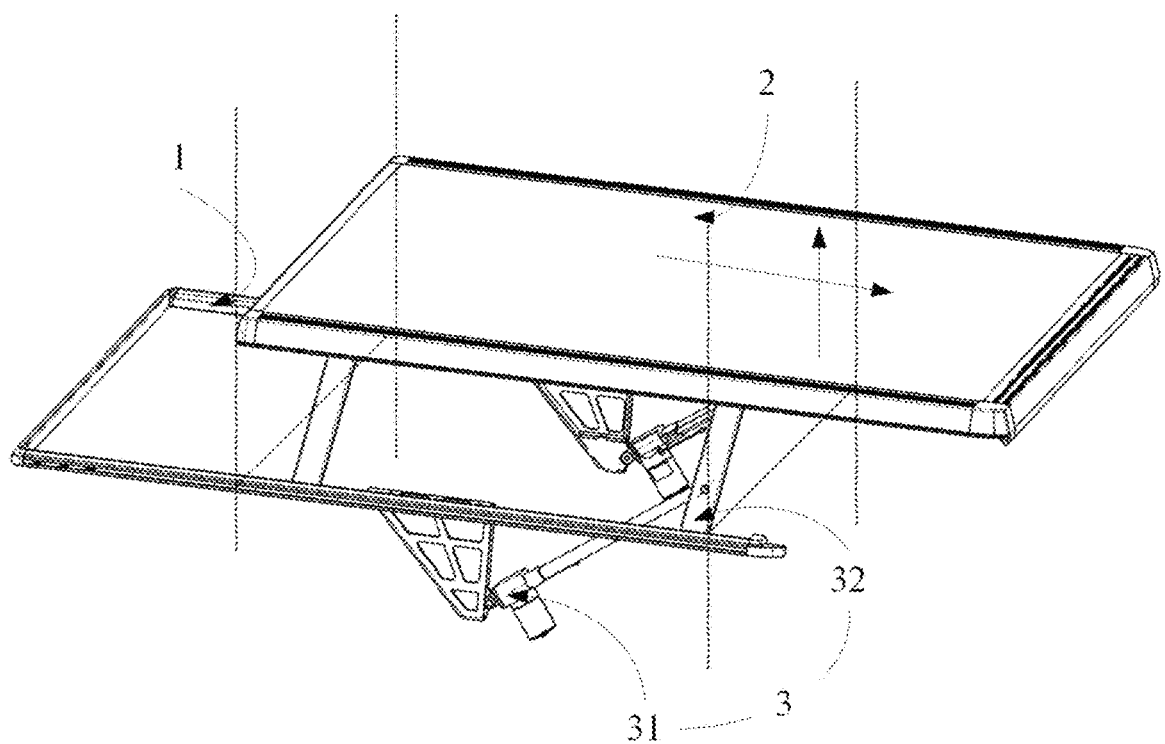
FIG. 1 illustrates a structural schematic view of a pickup truck add-on assembly with a headache rack and a luggage rack removed.
Figure 2:
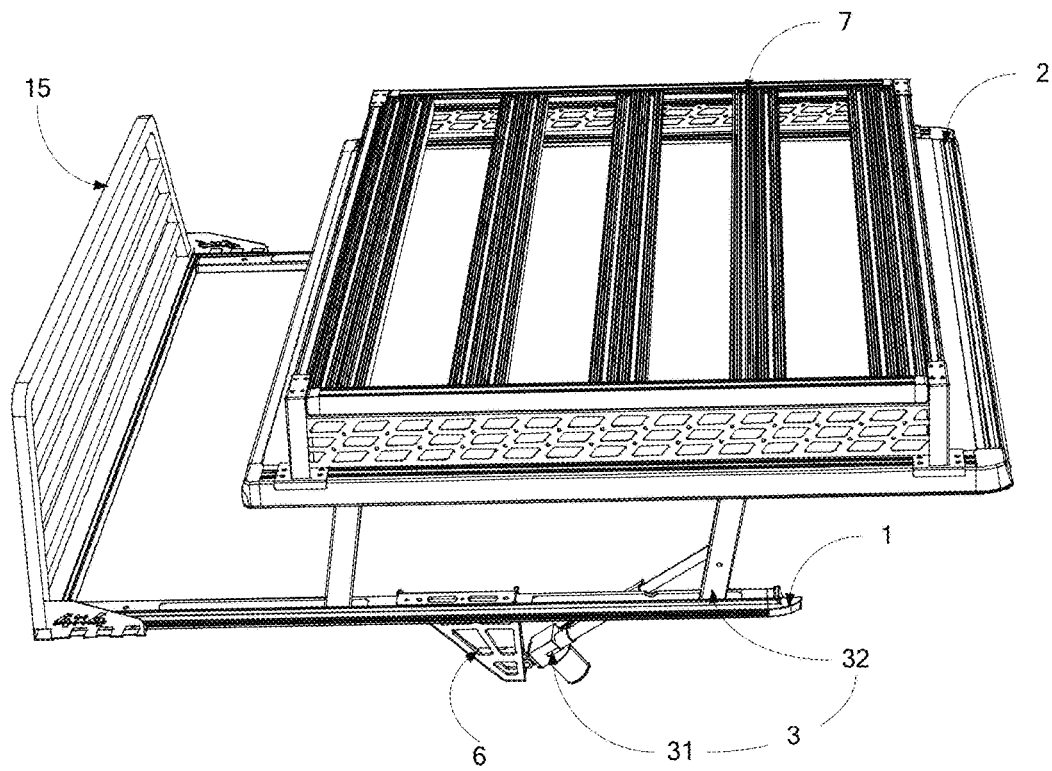
FIG. 2 illustrates a structural schematic view of the pickup truck add-on assembly.

Referring to FIGS. 1-2, the present disclosure proposes a pickup truck add-on assembly, comprising: a base 1 configured to be matched with and fixedly mounted to the pickup truck bed, an upper cover 2, and at least one driving assembly 3, wherein the driving assembly 3 comprises a driving mechanism 31 and a support arm 32, two ends of the support arm 32 are respectively hinged to the upper cover 2 and the base 1, the driving mechanism 31 is hinged to the support arm 32 and is configured to drive the support arm 32 to rotate, so that a hinge joint 4 between the support arm 32 and the upper cover 2 moves close to/away from the base 1 in a height direction. When the driving mechanism 31 drives the support arm 32 to rotate, the hinge joint 4 between the support arm 32 and the upper cover 2 moves from a left side to a right side of the hinge position between the support arm 32 and the base 1, or moves from the right side to the left side of the hinge position between the support arm 32 and the base 1, so as to gradually open or close the pickup truck bed.

When in use, the base 1 is fixed on the pickup truck, thus making the upper cover 2 covering the pickup truck bed. As the driving mechanism 31 drives the support arm 32 to rotate, which makes the hinge joint 4 where the support arm 32 is hinged with the upper cover 2 is switched between a position away from the base 1 and a position close to the base 1, the upper cover 2 is switched between an open state and a closed state accordingly. In this design manner, the driving mechanism 31 moves horizontally while pushing the upper cover 2 to move upwards, so that a certain open space is formed above the pickup truck bed after the upper cover 2 is completely opened, which facilitates the taking and placing of goods.

Specifically, the driving mechanism 31 may drive the support arm 32 to rotate to a horizontal state, and when the support arm 32 is in the horizontal state, the upper cover 2 abuts against the base 1. At this point, the pickup truck bed turns into a fully closed state.

Figure 3:
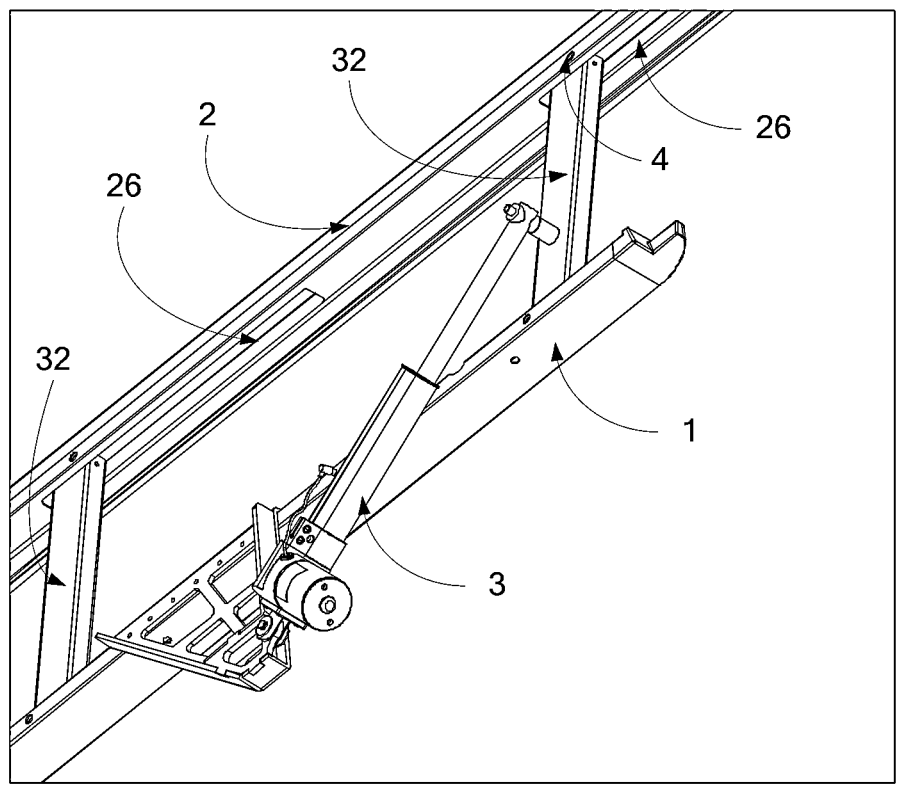
FIG. 3 illustrates a schematic view of position showing the upper accommodating groove in the pickup truck add-on assembly.
Figure 4:
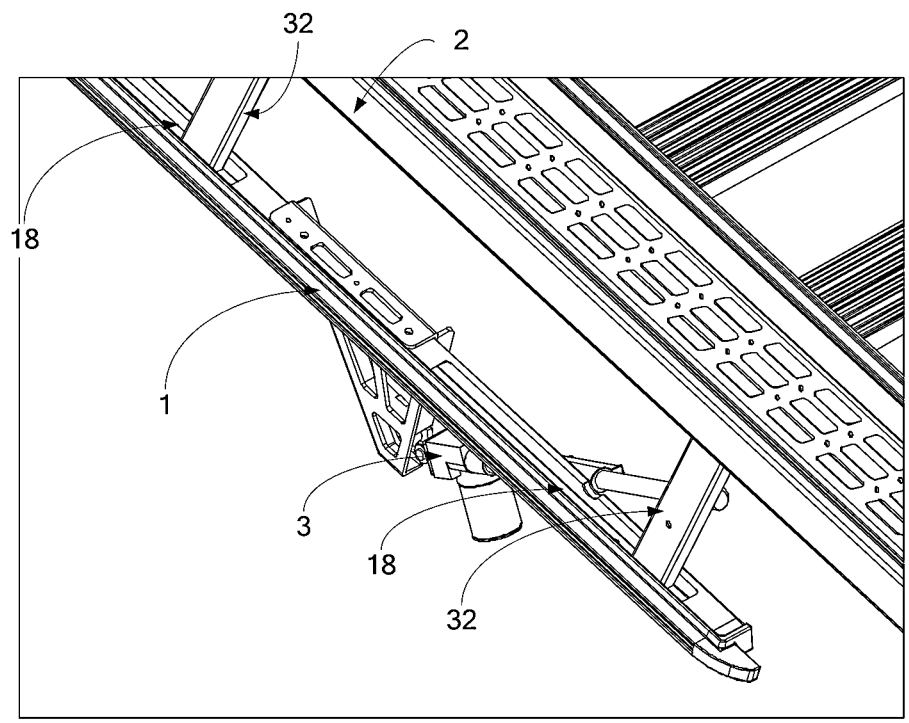
FIG. 4 illustrates a schematic view of position showing the lower accommodating groove in the pickup truck add-on assembly.

Referring to FIGS. 3-4, when the support arm 32 is in the horizontal state, the upper accommodating groove 26 provided on the upper cover 2 is snap-fitted with the lower accommodating groove 18 provided on the base 1 to accommodate the support arm 32 therebetween.

Figure 5:
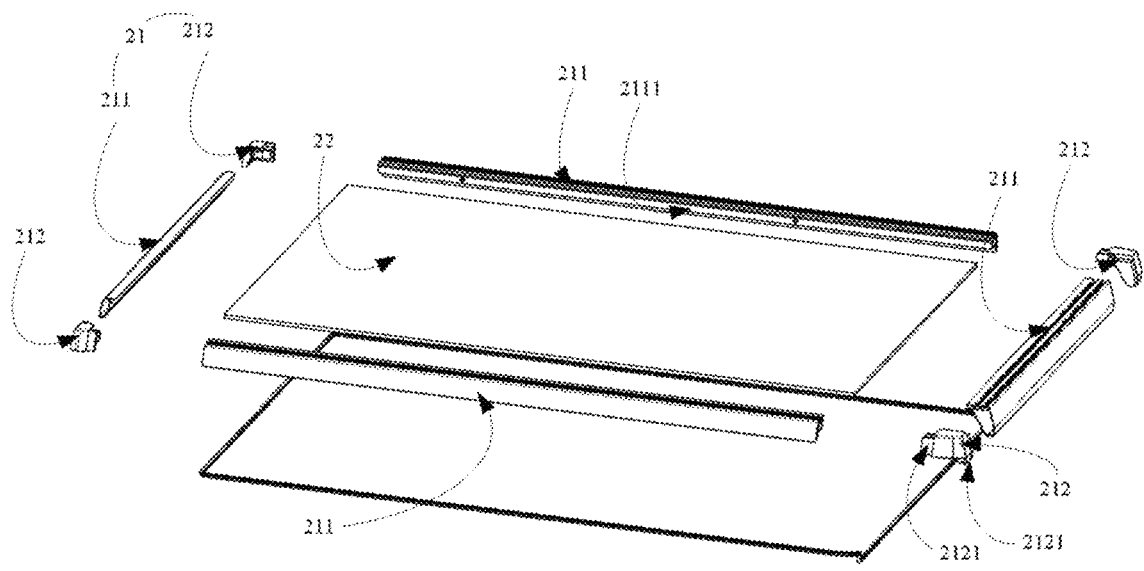
FIG. 5 illustrates an exploded view of the upper cover in the pickup truck add-on assembly.

Referring to FIG. 5, the upper cover 2 comprises a middle decorative plate 22 and an outer frame body 21 formed by at least four profiles C 211 and four corner connectors C 212 connected end to end; one end of the support arm 32 is hinged to the outer frame body 21; and each edge portion of the middle decorative plate 22 is adapted to be accommodated in a circumferential groove 2111 provided on the inner side of the outer frame body 21. This design manner allows the upper cover to be lightweight, and this combination assembly manner enables all the constituent components of the entire upper cover 2 to be replaced separately, thereby making the assembly, disassembly and replacement very convenient.

Specifically, the corner connector C 212 has two vertically disposed plug-in portions C 2121, and the two plug-in portions C 2121 are respectively inserted into end portions of two adjacent profiles C 211 and fixed thereto, and the middle decorative plate is a honeycomb panel or a PVC panel.

Figure 6:
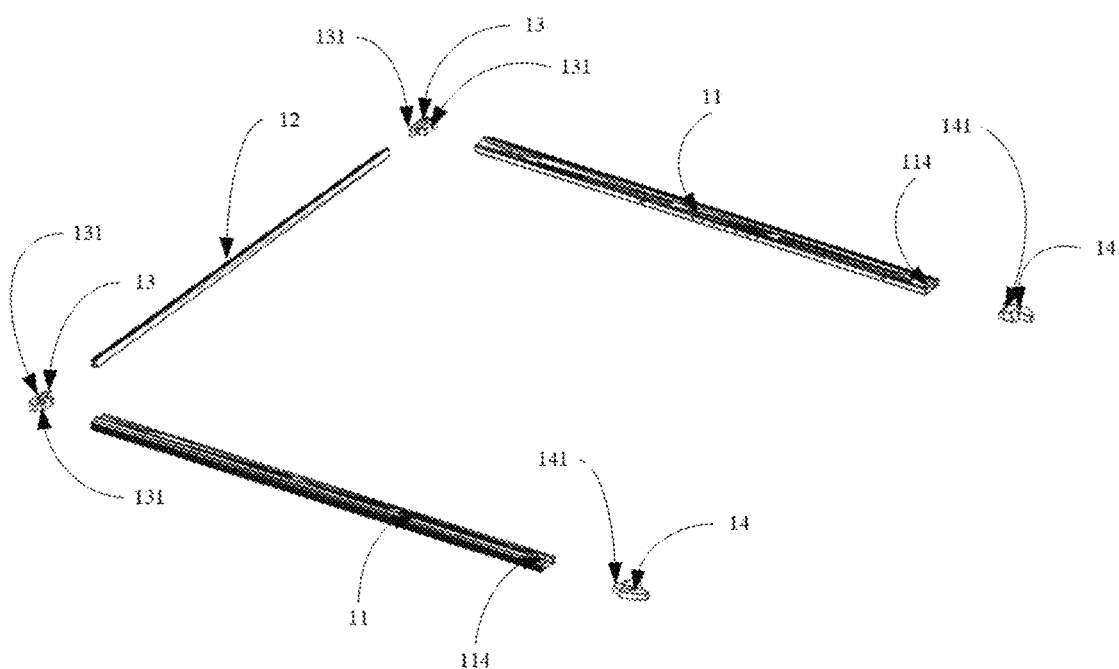
FIG. 6 illustrates an exploded view of the base in the pickup truck add-on assembly.

Referring to FIG. 6, the base 1 comprises at least two oppositely disposed profiles A 11, and the support arm 32 is mounted between each of the two profiles A 11 and the upper cover 2 for hinging the profile A 11 and the upper cover 2. The base 1 and the pickup truck are specifically assembled as follows:

The two profiles A 11 are arranged along the length direction of the pickup truck bed and are respectively fixed on the sides of both sides of the bed; and the driving mechanism 31 is located on the inner side of the bed. At this point, the upper cover 2 is located above the bed and covers the bed. When the driving mechanism 31 drives the support arm 32 to rotate so that the hinging joint 4 where the support arm 32 is hinged with the upper cover 2 is switched between a position away from the base 1 and a position close to the base 1, the upper cover 2 is switched between an opened state and a closed state accordingly. Such a design can not only ensure the stability of lifting and lowering of the upper cover 2, but also enhance the lifting capacity, thus making the upper cover 2 smoothly lifted and lowered in a case of a large load above the upper cover 2.

Figure 7:
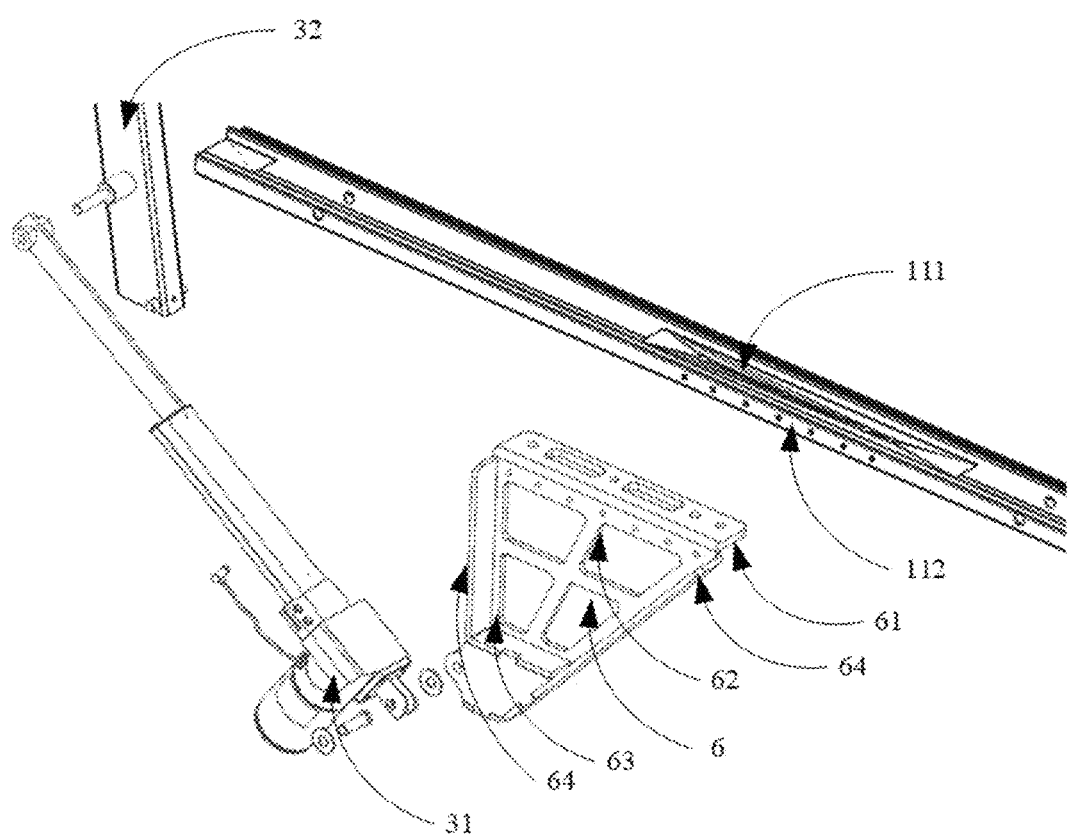
FIG. 7 illustrates a schematic view of components for assembling the support in the pickup truck add-on assembly.

Referring to FIG. 7, an L-shaped support 6 is provided on the profile A 11, wherein a first surface 61 of the support 6 is attached and fixed to an upper surface 111 of the profile A 11, an adjacent surface 62 of the support 6 is attached and fixed to a side wall 112 of the profile A 11, and the driving mechanism 31 is located at one side of the support 6 and hinged to the support 6. This structural design of the support 6 occupies a small space, has good effects of preventing looseness and strong supporting force, and is effective to ensure that the driving mechanism 31 has sufficient space for movement.

In addition, the vertical surface 63 of the support 6 forms a rim portion 64 away from the profile A 11, so as to enhance the support strength of the support 6 and enable the support 6 to have good resistance to deformation.

Figure 8:
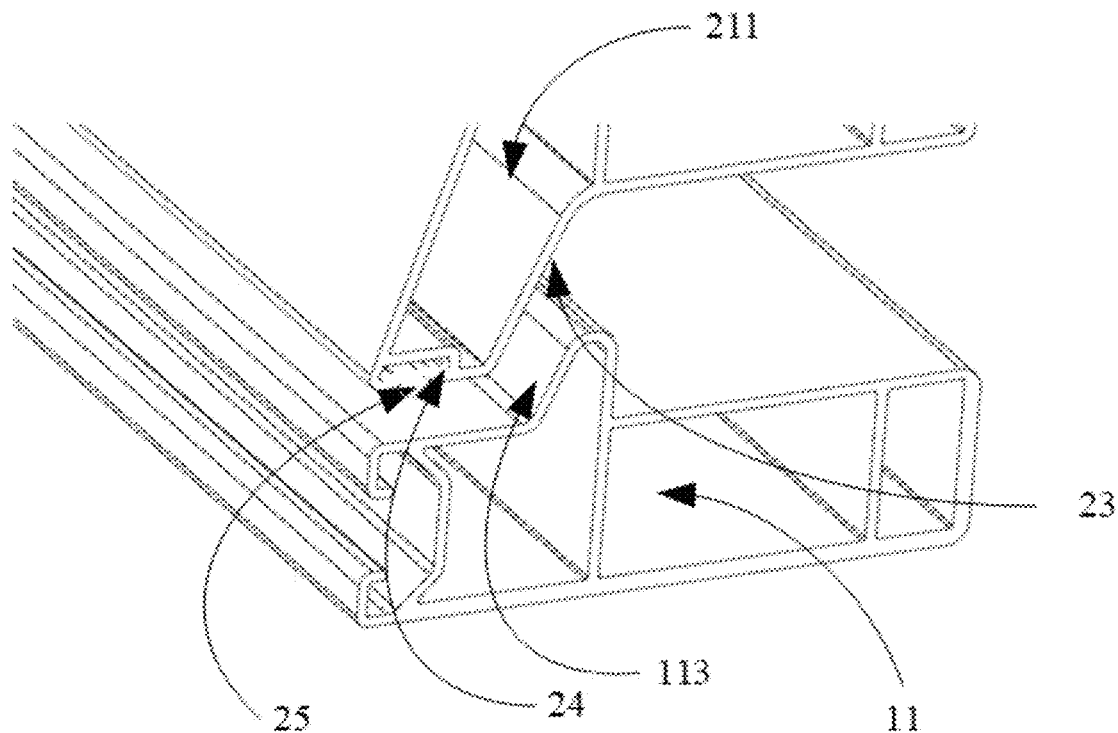
FIG. 8 illustrates a schematic view of mating of the first water blocking surface and the second water blocking surface in the pickup truck add-on assembly.

Referring to FIG. 8, the upper surface of the profile A 11 is provided with a first water blocking surface 113 above the upper surface and adapted to the length of the profile A 11, the upper cover 2 is provided with a second water blocking surface 23, and when the upper cover 2 abuts against the base 1, the first water blocking surface 113 attaches to the second water blocking surface 23, thereby forming a water cutting structure so as to block water outside the water cutting structure.

Figure 9:
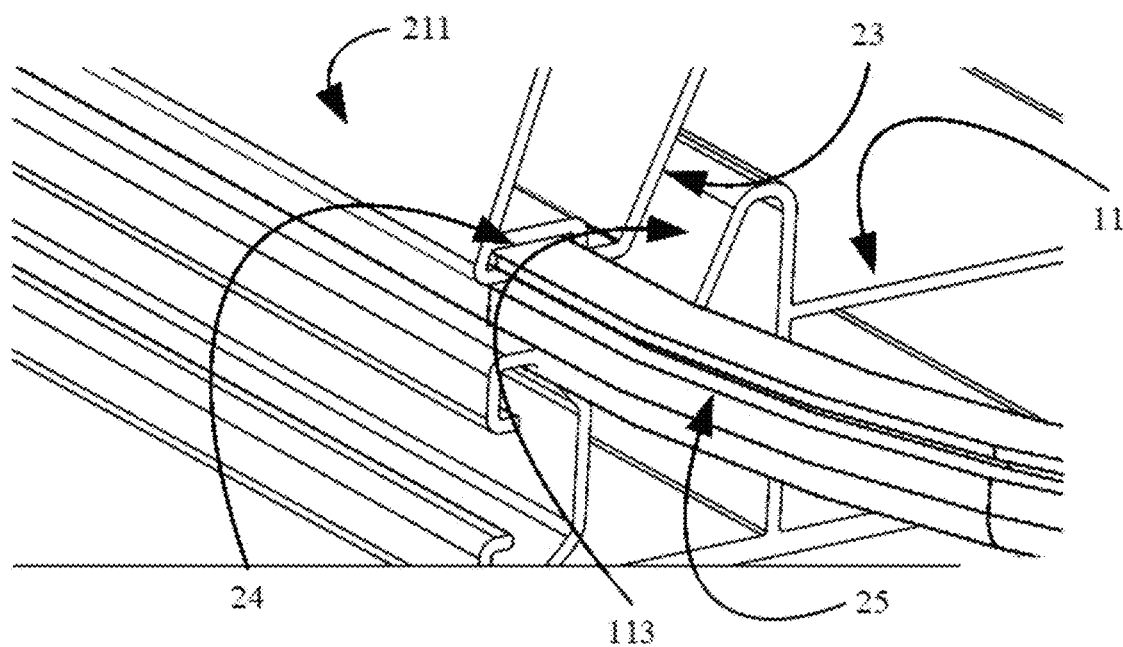
FIG. 9 illustrates a schematic view of mounting position of the waterproof rubber strip in the pickup truck add-on assembly.

Referring to FIG. 9, the upper cover 2 is provided, at the outer side of the second water blocking surface 23, with a clamping groove 24 adapted to the length of the upper cover 2, and a waterproof rubber strip 25 is mounted in the clamping groove 24. When the upper cover 2 abuts against the base 1, the waterproof rubber strip 25 abuts against the upper surface of the profiled A 11. In this way, a sealing structure is formed at the outer side of the water cutting structure, thereby increasing water blocking effects.

Referring to FIG. 6, the base 1 further comprises a profile B 12, two corner connectors A 13 and two corner connectors B 14, two ends of the profile B 12 are fixedly connected to the two profiles A 11 respectively via the two corner connectors A 13, and the two corner connectors B 14 are respectively fixedly mounted on free ends 114 of the two profiles A 11. The two profiles A 11 are connected together by means of the profile B 12 to form an integral, and the joints of the profile B 12 and the profile A 11 are connected by means of the corner connector A 13, thereby enabling the rapid assembly and disassembly of the base 1 and the replacement of parts when desired.

Specifically, the corner connector A 13 has two vertically disposed plug-in portions A 131 which are respectively inserted into end portions of the profile A 11 and the profile B 12 and fixed thereto, and the corner connector B 14 has a plug-in portion B 141 which is inserted into the free end 114 of the profile A 11 and fixed thereof.

Figure 10:
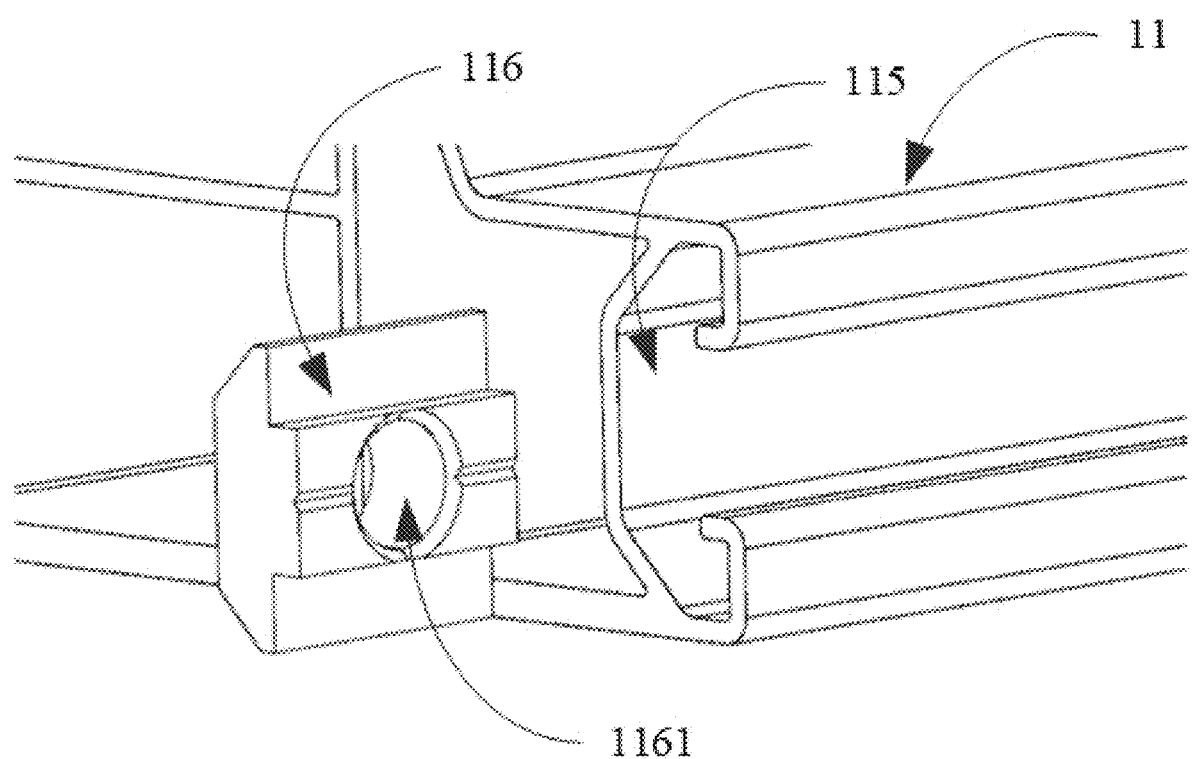
FIG. 10 illustrates a first enlarged partial view of the profile A in the pickup truck add-on assembly.
Figure 11:
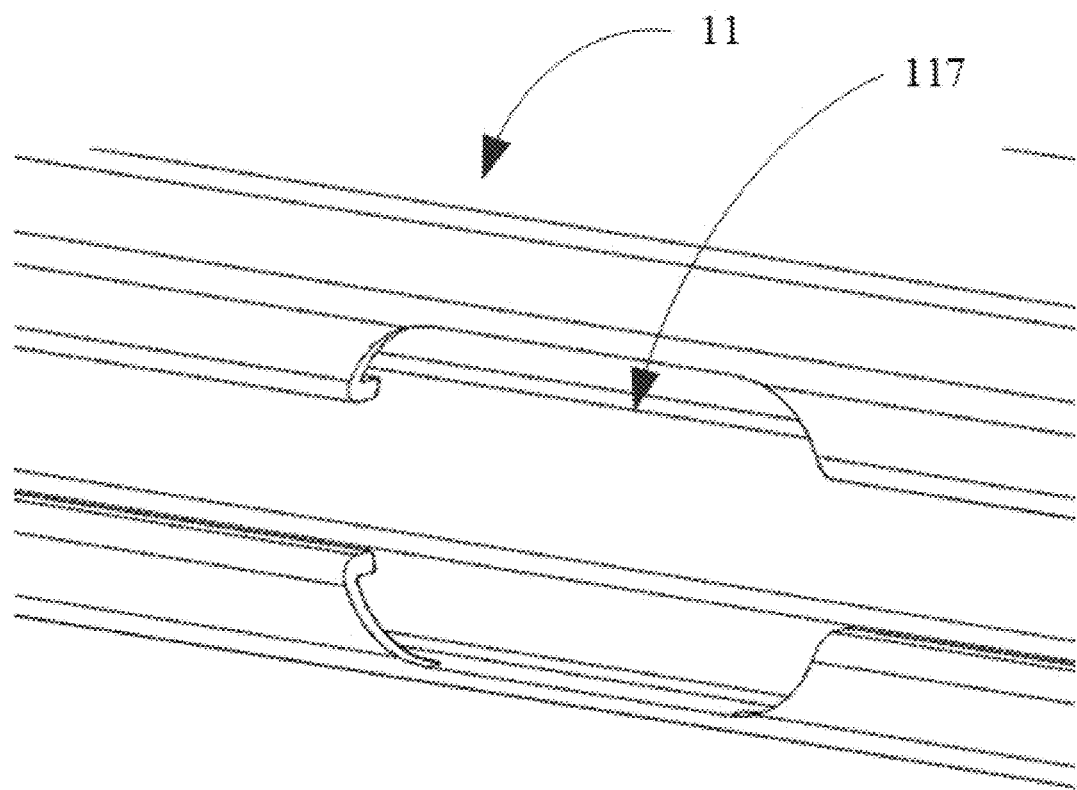
FIG. 11 illustrates a second enlarged partial view of the profile A in the pickup truck add-on assembly.

Referring to FIGS. 10-11, the profile A 11 is provided with a sliding groove A 115 along the length direction of the profile A 11, the sliding groove A 115 is provided therein with a sliding block A 116 slidable in the sliding groove A 115, the profile A 11 is further provided with an inlet/outlet A 117 for assembling or disassembling the sliding block A 116, and the sliding block A 116 is provided thereon with a mounting hole A 1161. The number of the sliding blocks A 116 in the sliding groove A 115 may be arbitrarily increased or decreased through the inlet/outlet A 117, and then the external add-on parts on the base 1 may be expanded according to the needs in practical use.

Figure 12:
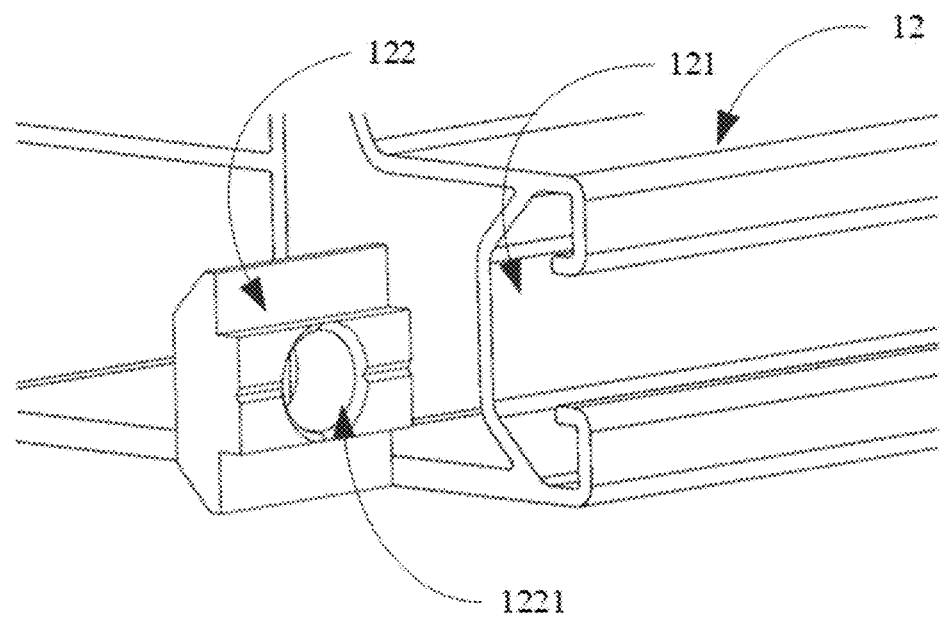
FIG. 12 illustrates a first enlarged partial view of the profile B in the pickup truck add-on assembly.
Figure 13:
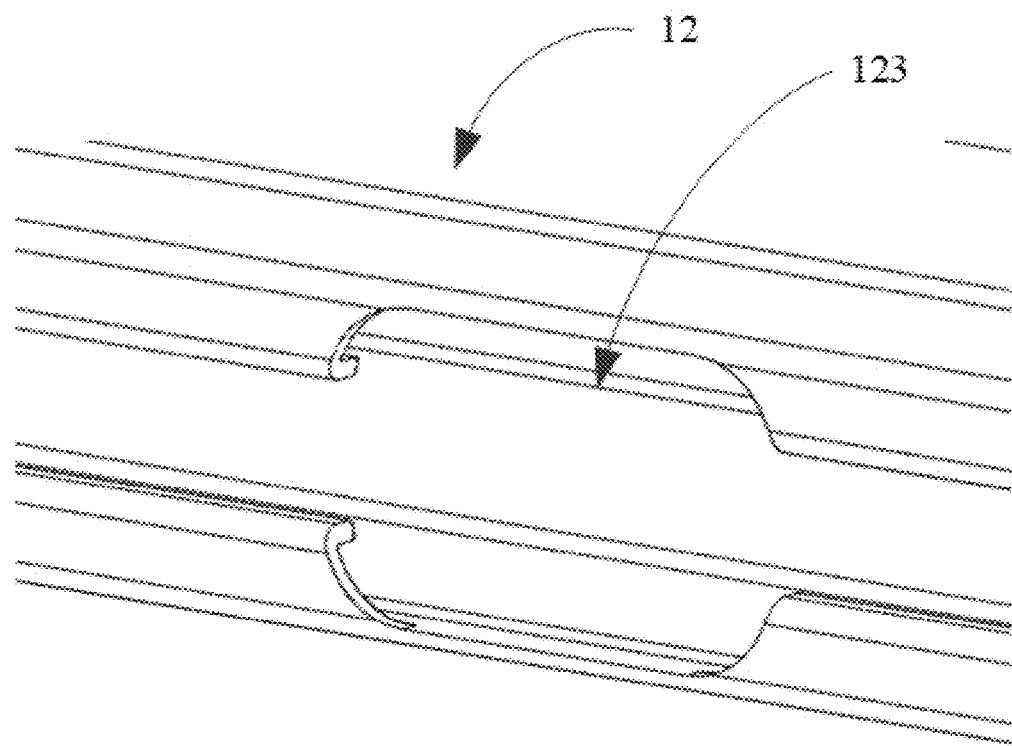
FIG. 13 illustrates a second enlarged partial view of the profile B in the pickup truck add-on assembly.

Referring to FIGS. 12-13, similarly, the profile B 12 is provided with a sliding groove B 121 along the length direction of the profile B 12, the sliding groove B 121 is provided therein with a sliding block B 122 slidable in the sliding groove B 121, the profile B 12 is further provided with an inlet/outlet B 123 for assembling or disassembling the sliding block B 122, and the sliding block B 122 is provided thereon with a mounting hole B 1221. The number of the sliding blocks B 122 in the sliding groove B 121 may be arbitrarily increased or decreased through the inlet/outlet B 123, and then the external add-on parts on the base 1 may be expanded according to the needs in practical use.

Figure 14:
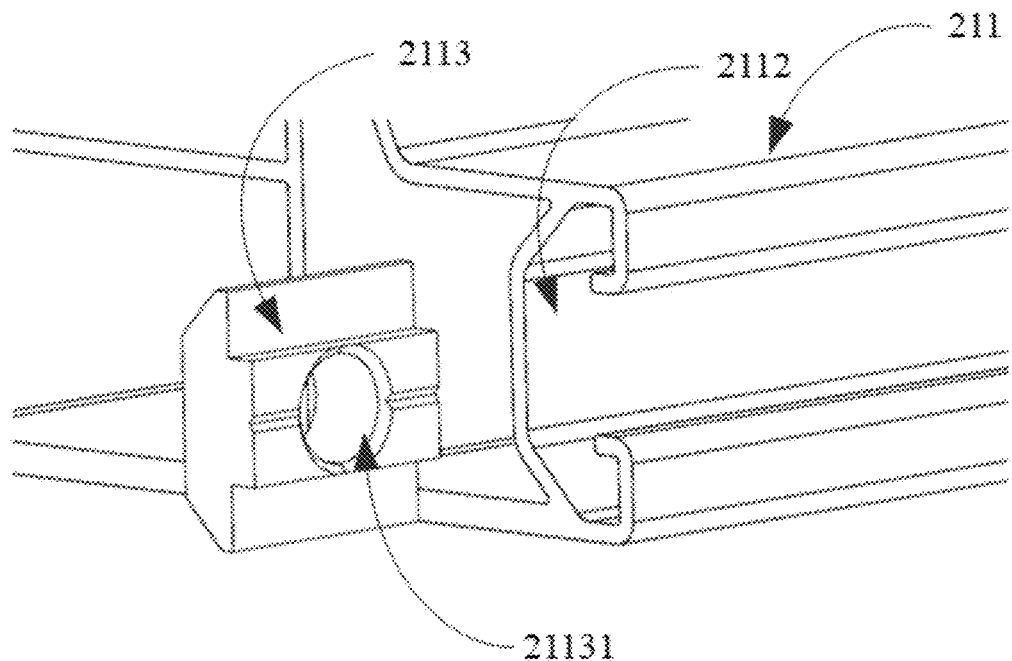
FIG. 14 illustrates a first enlarged partial view of the profile C in the pickup truck add-on assembly.
Figure 15:
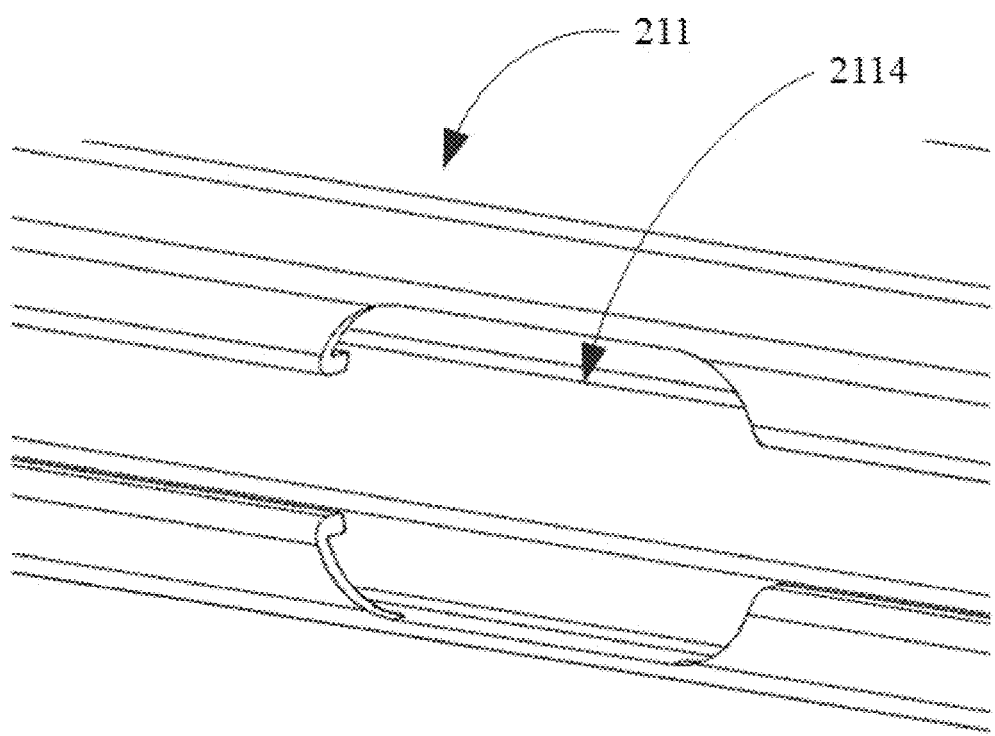
FIG. 15 illustrates a second enlarged partial view of the profile C in the pickup truck add-on assembly.

Referring to FIGS. 14-15, similarly, the profile C 211 is provided with a sliding groove C 2112 along the length direction of the profile C 211, the sliding groove C 2112 is provided therein with a sliding block C 2113 slidable in the sliding groove C 2112, the profile C 211 is further provided with an inlet/outlet C 2114 for assembling or disassembling the sliding block C 2113, and the slide block C 2113 is provided thereon with a mounting hole C 21131. The number of the sliding blocks C 2113 in the sliding groove C 2112 may be arbitrarily increased or decreased through the inlet/outlet C 2114, and then the external add-on parts on the upper cover 2 may be expanded according to the needs in practical use.

Figure 16:
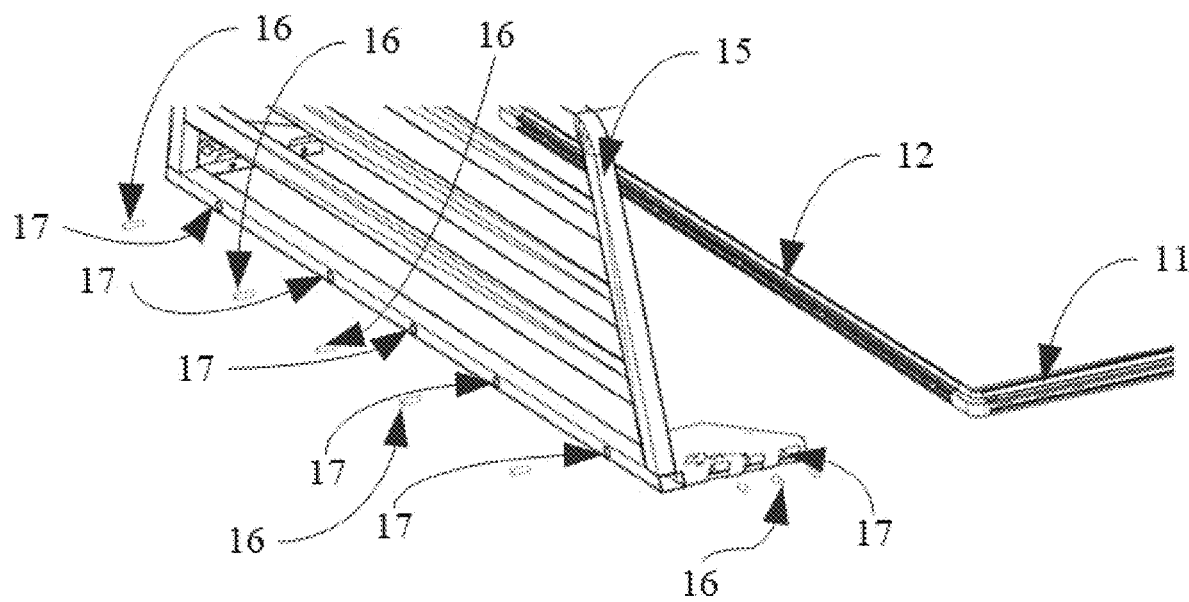
FIG. 16 illustrates a schematic view of installation showing the headache rack in the pickup truck add-on assembly.

Referring to FIG. 16, the base 1 further comprises a headache rack 15, wherein a hole 17 is reserved on the headache rack 15, the headache rack 15 being located on one side of the profile B 12 away from the profile A 11, and being fixed to the sliding block A 116 and/or the sliding block B 122 by a threaded fastener 16 passing through the hole 17, so that the headache rack 15 is integrated with the profile A 11 and the profile B 12. Since the sliding block A 116 or the sliding block B 122 may move at random according to the position of the hole 17, it reduces machining limit of the matching degree between the hole 17 and the profile A 11/the profile B 12, which benefits the improvement of machining efficiency, and enhances the versatility of the profile A 11, the profile B 12 and the headache rack 15.

Figure 17:
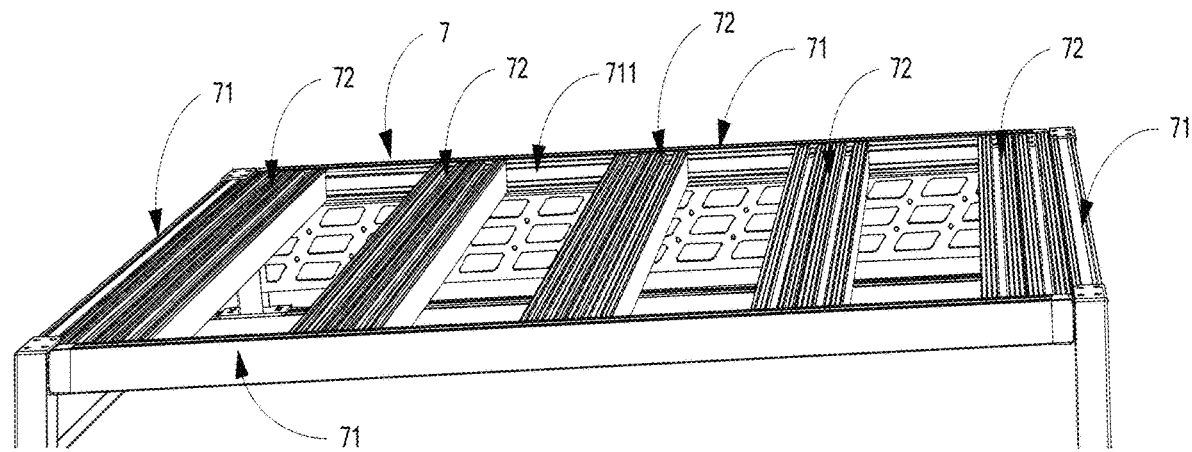
FIG. 17 illustrates a structural schematic view of the luggage rack in the pickup truck add-on assembly.

Referring to FIG. 17, the assembly further comprises a luggage rack 7 which is mounted on the upper cover 2 and located above the upper cover 2.

Specifically, the luggage rack 7 comprises a frame body 71 mounted on the upper cover 2, two side grooves 711 arranged in parallel along the length direction of the frame body 71 are provided on the inner side of the frame body 71, two ends of each of several movable plates 72 are respectively accommodated in the two side grooves 711, the several movable plates 72 are arranged in parallel, the movable plates 72 are movable along the length direction of the frame body 71, and a limiting member for limiting displacement of the movable plates 72 is mounted on the frame body 71 between adjacent ones of the movable plates 72. When in use, by removing the limit of the limiting member on the corresponding movable plate 72, the movable plate 72 may slide in the side groove 711, thereby adjusting the spacing between the movable plates 72. In this way, it not only facilitates the adjustment of the placement position according to the size of the luggage pieces, but also enables to fix the luggage pieces on the upper cover 2 below the movable plate 72 and take out the luggage pieces fixed between the upper cover 2 and the movable plate 72 by moving the movable plate 72.

In addition, the present embodiment further comprises a folding ladder 8, which is movably assembled with the luggage rack 7.

Figure 18:
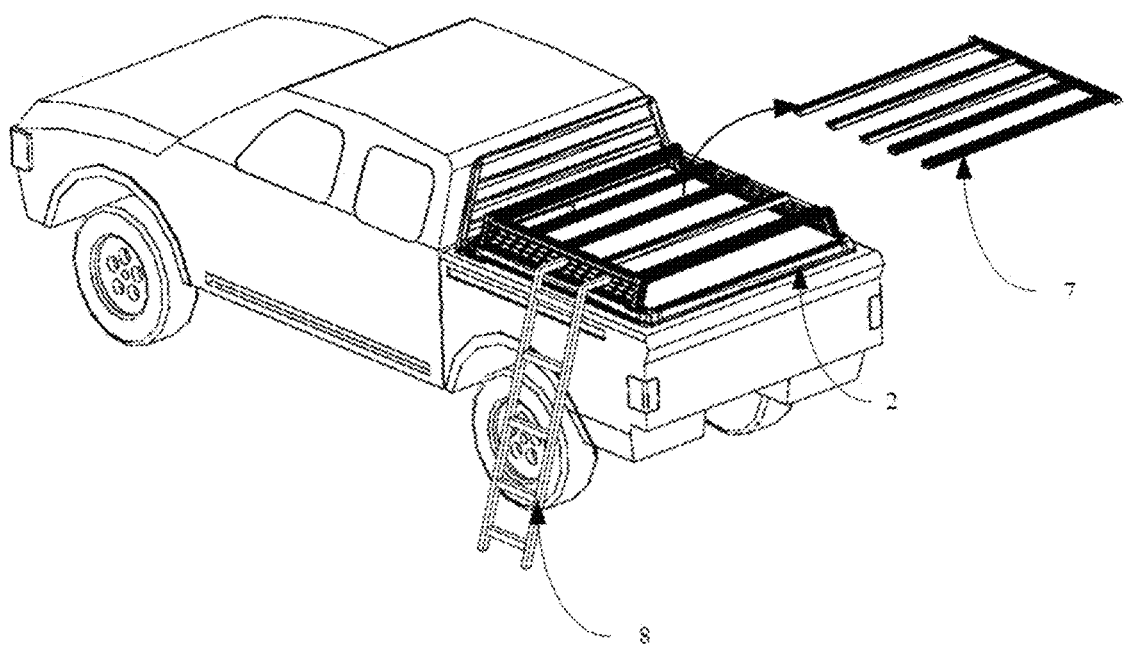
FIG. 18 illustrates a structural schematic view of a pickup truck.

Referring to FIG. 18, the present disclosure proposes a pickup truck having a pickup truck add-on assembly mounted thereon as described above.

Although preferred embodiments of the present disclosure have been described, the scope of the present disclosure is not limited thereto. Any equivalents or modifications made by those skilled in the art according to the technical solutions and concepts of the present disclosure within the technical scope disclosed herein shall fall within the scope of the present disclosure.

The invention claimed is:

1. A pickup truck add-on assembly, comprising:
a base (1) configured to be matched with and fixedly mounted to a pickup truck bed;
an upper cover (2); and
at least one driving assembly (3), wherein the driving assembly (3) comprises a driving mechanism (31) and a support arm (32), two ends of the support arm (32) are respectively hinged to the upper cover (2) and the base (1), the driving mechanism (31) is hinged to the support arm (32) and is configured to drive the support arm (32) to rotate, so that a hinge joint (4) between the support arm (32) and the upper cover (2) in an initial hinge position: i. moves the base (1) in a height direction; and ii. moves laterally, in a direction transverse to the height direction, from the hinge position,
wherein the base (1) comprises at least two oppositely disposed profiles A (11),
wherein the support arm (32) is mounted between the two profiles A (11) and the upper cover (2) for hinging the profile A and the upper cover, and
wherein an L-shaped support (6) is provided on the profile A (11), wherein a first surface (61) of the L-shaped support (6) is attached and fixed to an upper surface (111) of the profile A (11), an adjacent surface (62) of the L-shaped support is attached and fixed to a side wall (112) of the profile A (11), and the driving mechanism (31) is located at one side of the L-shaped support (6) and hinged to the L-shaped support (6).

2. The assembly of claim 1, wherein the driving mechanism (31) is configured to drive the support arm (32) to rotate to a horizontal state, and when the support arm (32) is in the horizontal state, the upper cover (2) abuts against the base (1).

3. The assembly of claim 2, wherein an upper accommodating groove (26) provided on the upper cover (2) is snap-fitted with a lower accommodating groove (18) provided on the base (1) to accommodate the support arm (32) therebetween when the support arm (32) is in the horizontal state.

4. The assembly of claim 1, wherein the upper cover (2) comprises a middle decorative plate (22) and an outer frame body (21) formed by at least four profiles C (211) and four corner connectors C (212) connected end to end; one end of the support arm (32) is hinged to the outer frame body (21) to define the hinge joint (4); and each edge portion of the middle decorative plate (22) is adapted to be accommodated in a circumferential groove (2111) provided on an inner side of the outer frame body (21).

5. The assembly of claim 4, wherein each of the corner connectors C (212) has two vertically disposed plug-in portions C (2121), and the two plug-in portions C (2121) are respectively inserted into end portions of two adjacent ones of the profiles C (211) and fixed thereto.

6. The assembly of claim 4, wherein the middle decorative plate (22) is a honeycomb panel or a PVC panel.

7. The assembly of claim 1, wherein a vertical surface (63) of the L-shaped support (6) forms a rim portion (64) away from the profile A (11).

8. The assembly of claim 1, wherein an upper surface of the profile A (11) is provided with a first water blocking surface (113) above the upper surface and adapted to the length of the profile A (11), the upper cover (2) is provided with a second water blocking surface (23), and when the upper cover (2) abuts against the base (1), the first water blocking surface (113) attaches to the second water blocking surface (23).

9. The assembly of claim 8, wherein the upper cover (2) is provided, at an outer side of the second water blocking surface (23), with a clamping groove (24) adapted to the length of the upper cover (2), and a waterproof rubber strip (25) is mounted in the clamping groove (24), when the upper cover (2) abuts against the base (1), the waterproof rubber strip (25) abuts against the upper surface of the profile A (11).

10. The assembly of claim 1, wherein the base further comprises a profile B (12), two corner connectors A (13) and two corner connectors B (14), two ends of the profile B (12) are fixedly connected to the two profiles A (11) respectively via the two corner connectors A (13), and the two corner connectors B (14) are respectively fixedly mounted on free ends (114) of the two profiles A (11).

11. The assembly of claim 10, wherein each of the corner connectors A (13) has two vertically disposed plug-in portions A (131) configured to be respectively inserted into an end portion of one of the profiles A (11) and an end portion of the profile B (12) and fixed thereto, and each of the corner connectors B (14) has a plug-in portion B (141) configured to be inserted into the free end (114) of one of the profiles A (11) and fixed thereto.

12. The assembly of claim 1, wherein the profile A (11) is provided with a sliding groove A (115) along a length direction of the profile A (11), the sliding groove A (115) is provided with a sliding block A (116) slidable in the sliding groove A, the profile A (11) is further provided with an inlet/outlet A (117) for assembling or disassembling the sliding block A (116), and the sliding block A (116) is provided thereon with a mounting hole A (1161).

13. The assembly of claim 12, wherein the profile B (12) is provided with a sliding groove B (121) along a length direction of the profile B (12), the sliding groove B (121) is provided with a sliding block B (122) slidable in the sliding groove B (121), the profile B (12) is further provided with an inlet/outlet B (123) for assembling or disassembling the sliding block B (122), and the sliding block B (122) is provided thereon with a mounting hole B (1221).

14. The assembly of claim 13, wherein the base (1) further comprises a headache rack (15), wherein a hole (17) is provided on the headache rack (15), the headache rack (15) is located on one side of the profile B (12) away from the profile A (11), and is fixed to the sliding block A (116) and/or the sliding block B (122) by a threaded fastener (16) passing through the hole (17).

15. The assembly of claim 4, wherein the profile C (211) is provided with a sliding groove C (2112) along a length direction of at least one of the profiles C (211), the sliding groove C (2112) is provided with a sliding block C (2113) slidable in the sliding groove C (2112), the at least one of the profiles C (211) is further provided with an inlet/outlet C (2114) for assembling or disassembling the sliding block C (2113), and the sliding block C (2113) is provided thereon with a mounting hole C (21131).

16. The assembly of claim 4, further comprising:
a luggage rack (7) mounted on the upper cover (2) and located above the upper cover (2).

17. The assembly of claim 16, wherein the luggage rack (7) comprises a frame body (71) mounted on the upper cover (2), two side grooves (711) arranged in parallel along a length direction of the frame body (71) are provided on an inner side of the frame body (71), two ends of each of several movable plates (72) are respectively accommodated in the two side grooves (711), the several movable plates (72) are arranged in parallel, the movable plates (72) are movable along the length direction of the frame body (71), and a limiting member is mounted on the frame body (71) between adjacent ones of the movable plates (72) for limiting displacement of the movable plates (72).

18. The assembly of claim 17, further comprising:
a folding ladder (8) movably assembled with the luggage rack (7).

19. A pickup truck, wherein a pickup truck add-on assembly as claimed in claim 1 is mounted on the pickup truck.

* * * * *